UNITED STATES PATENT OFFICE.

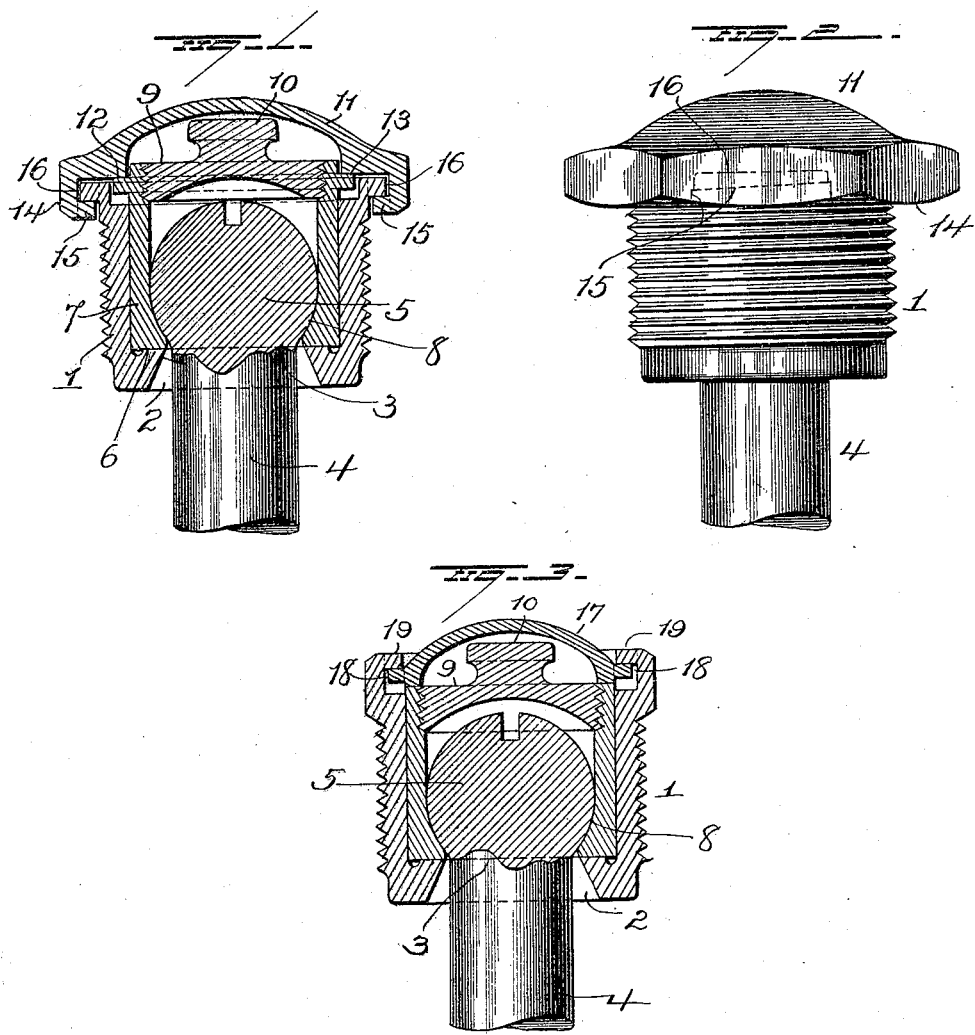

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,295,869.     Specification of Letters Patent.     Patented Mar. 4, 1919.

Application filed May 3, 1918. Serial No. 232,311.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-Bolt Structures; and I do hereby declare the following to be a full, clear, and exact description of the invention, such as will enable others skilled in the art to which it appertains to make and use the same.

This invention relates to improvements in staybolt structures and more particularly to the devices which provide an inclosed bearing for the round or spherical head of a staybolt, the object of the invention being to so construct such devices that, while they will serve to provide an efficient and tightly closed bearing for the head of the staybolt normally, still so that examination and testing of the staybolt may be quickly accomplished.

With this and other objects in view, the invention consists in certain novel features of construction and combinations of parts as hereinafter set forth and pointed out in the claims.

In the accompanying drawings, Figure 1 is a longitudinal view of the staybolt structure. Fig. 2 is a side elevation, and Fig. 3 is a view of a modification.

1 represents a bushing adapted for connection with a boiler sheet and provided at its inner end with a tapering opening 2 for the accommodation of the neck 3 of a stay bolt 4,—the latter having a rounded or spherical head 5. The bushing 1 is provided at its inner end with an annular seat 6 on which a sleeve 7 rests. This sleeve is disposed and fits neatly within a bushing 1 and is formed with a curved interior face 8 forming a bearing for the rounded or spherical head of the bolt. To facilitate the assembling of the head of the bolt within the bearing sleeve 7, the latter is made with an open outer end which is normally closed over the head of the bolt by means of a threaded plug 9 having a knob or head 10.

A cap 11 is disposed over and covers the outer end of the bearing sleeve 7 and plug 9,—said cap having an internal annular shoulder 12 which bears against an annular flange 13 projecting from the bearing sleeve near its outer end. The cap 11 is formed with a peripheral flange 14 to surround the outer end portion of the bushing 1 and this flange is provided with internal segmental shoulders 15 to engage under or behind segmental shoulders 16 on the bushing 1. If desired the segmental shoulders 15 and 16 may be made with coacting cam faces.

When the parts are assembled and the cap 11 turned so that the shoulders 15 thereon will engage behind the shoulders 16 on the bushing, the annular shoulder 12 in the cap will press firmly against the annular flange 13 on the sleeve 7 and retain the latter properly in place. By turning the cap 11 so as to disengage the shoulders 15 from the shoulders 16, said cap may be at once removed and then by the application of a suitable tool to the head 10 of the plug 9, the operator may attempt to withdraw the bearing sleeve 7, and his inability to do so will indicate that the bolt is whole.

In the form of the invention shown in Fig. 3, a cap 17 is shown having external segmental shoulders 18 to engage behind inwardly projecting shoulders 19 at the outer end of the bushing 1.

Having fully described my invention what I claim as new and desire to secure by Letters-Patent, is:

1. In a staybolt structure, the combination with a bushing, of a bearing sleeve mounted therein, and a cap having interlocking engagement with the bushing and engaging said bearing sleeve.

2. In a staybolt structure, the combination with a bushing, of a sleeve mounted therein and forming a bearing for the rounded head of a staybolt, a cap covering said sleeve and engaging the same, segmental shoulders on the bushing, and segmental shoulders in the cap coöperable with segmental shoulders on the bushing.

3. In a staybolt structure, the combination with a bushing provided with segmental shoulders, of a sleeve mounted in said bushing and providing a bearing for the rounded head of a staybolt, said sleeve having an annular shoulder, a headed plug closing the outer end of the sleeve, and a cap covering the outer end of the sleeve and the plug therein and having a peripheral flange provided with internal segmental shoulders to engage behind the segmental shoulders on the bushing and said cap also having an annular shoulder to engage the annular flange on the sleeve.

In testimony whereof, I have signed this specification in the presence of two subscribing witnesses.

ETHAN I. DODDS.

Witnesses:
S. G. NOTTINGHAM,
R. S. FERGUSON.

Copies of this patent may be obtained for five cents each, by addressing the "Commissioner of Patents, Washington, D. C."